Figure 1:
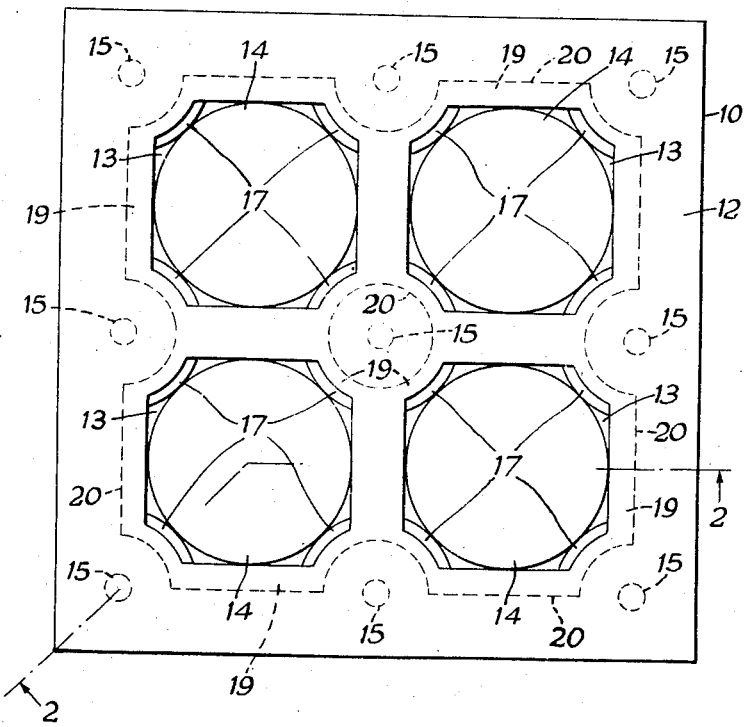

Oct. 28, 1958    B. STEVENS ET AL    2,858,417
INSTRUMENT DIAL ILLUMINATOR
Filed Jan. 3, 1956

INVENTORS
BERTRAM STEVENS,
EDGAR STEPHENSON,
MARIAN A. LANCUCKI,
by Hall + Haughton
ATTORNEY

United States Patent Office 2,858,417
Patented Oct. 28, 1958

2,858,417

INSTRUMENT DIAL ILLUMINATOR

Bertram Stevens, North End, Durham, Edgar Stephenson, West Cornforth, Ferry Hill, and Marian Alexsander Lancucki, Enfield, England Application January 3, 1956, Serial No. 557,190

Claims priority, application Great Britain January 6, 1955

6 Claims. (Cl. 240—8.16)

The present invention relates to the illumination of surfaces of members, such as the surfaces of instrument dials, disposed in or behind a panel.

One example is an instrument dial arranged in an aperture in a trans-illuminated panel of light-transmitting material, such as clear methyl methacrylate polymer, the trans-illumination being produced by one or more light sources arranged in a further aperture or apertures respectively in the panel, the light from the source or sources being transmitted by reflection or diffusion in directions generally parallel to the major surfaces of the panel.

With all such panels it is a requirement that as much light as possible should be incident upon the surface to be illuminated, but as little light as possible should be directed toward the observer, since the latter may result in distraction and fatigue of the eye of the observer and a reduction in contrast.

An object of the present invention is to provide a trans-illuminated panel for the illumination of a surface of a member, the panel having an aperture for the reception of the member, in which loss of the light for illumination, by reflection from the aperture edge, is reduced.

In accordance with the present invention the said object is achieved by providing a trans-illuminated panel for the illumination of a surface of a member, such as an instrument dial, which panel has an aperture for the reception of the member and at least one light source aperture for the reception of a light source, with a part of the edge of the first-mentioned aperture nearest to the light source concave toward the light source aperture.

Another object of this invention is to provide a panel for the illumination of a surface of a member by which the proportion of light directed toward an observer is reduced.

In accordance with the present invention, the latter object, inter alia, is achieved by providing a trans-illuminated panel, including the features of the invention as specified above, in which the panel surface remote from an observer has the part thereof surrounding the said first-mentioned apertures rendered light-absorbing. Preferably, the said surface or part thereof is rendered light-absorbing by having applied thereto by a pressure moulding operation a layer of an opaque synthetic resin.

Figure 2:
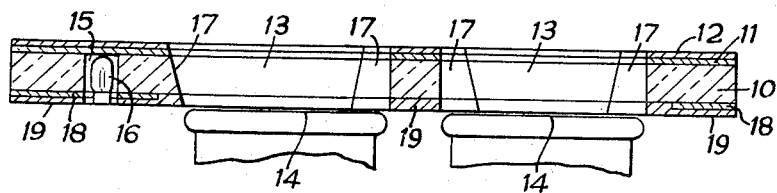

A preferred embodiment of the invention will now be described, by way of example, with reference to the accompanying diagrammatic drawing wherein:

Figure 1 is a plan view of a panel employing nine light sources for the illumination of four instrument dials, and Figure 2 is a section taken on the line 2—2 of Figure 1.

In the drawings, for the sake of clarity, the thicknesses of the various layers have been exaggerated.

The panel comprises a sheet 10 of clear methyl methacrylate polymer having on its front surface a white, diffusing light-transmitting layer 11 covered by a black opaque layer 12. If part of the black opaque layer 12 is removed then the corresponding part of the diffusing layer 11 is seen by an observer, illuminated by the light transmitted thereby from the panel. A plurality (in this embodiment four) of instrument apertures 13 are formed in the panel for the reception of instrument dials 14 and another plurality (in this embodiment nine) of light source apertures 15 are provided interspersed among the instrument apertures; each of the light source apertures receiving a light source in the form of an incandescent filament "pea" lamp 16.

The parts 17 of the edge of each instrument aperture 13 are concave, each towards its nearest light source, and preferably are formed by arcs of circles having the light sources at their centers. Thus, in the embodiment shown, each instrument aperture is surrounded by four equally-spaced light sources and has four concavely curved perimetral portions disposed proximate to said light sources respectively, as seen in plan. With this arrangement the surfaces of said arcuate portions constitute or exhibit, extended areas concentric with the respective light source apertures, which extended areas lie normal, as viewed in plan, to the direction of propagation of the light radially through the sheet from the light source apertures. Thus a large proportion of the light so propagated is transmitted to the surface to be illuminated. This would not be the case if the portions 17 were concentric to the centers of the viewing apertures or to other centers so that all areas thereof were inclined at a progressively decreasing reflecting angle to the direction of propagation of the light in the plane of the sheet. Also with the described arrangement virtually all of the light so transmitted to the surface to be illuminated is transmitted, as viewed in plan, without change of its direction of propagation radially from the light source apertures. In brief, the part of the edge of each viewing aperture proximate to a light source aperture is concave toward said light source aperture and exhibits an extended arcuate area having as a center of curvature, in the plane of the sheet, the central axis of said light source aperture. When the said arcuate area is inclined in the direction normal to the plane of the sheet, as shown and hereinafter described, it constitutes a cone of revolution having as its center of curvature the central axis of said light source aperture.

If an instrument aperture has only one or two light sources near enough to be effective then only the parts 17 of the edge nearer to the respective light sources are concave towards the sources. The said parts 17 of the edges (Fig. 2) of the instrument aperture may be at an inclination of about 30° to the normal to assist the direction of light towards the instrument dial and prevent its direction toward the observer.

The rear surface of the panel is provided with a white reflecting layer 18 and a black opaque layer 19 to prevent escape of light from the panel and to assist the transmission of light from the sources to the instrument apertures. The part of this reflecting layer 18 surrounding each instrument aperture tends to direct light toward an observer and, in accordance with this invention, this part of the layer is removed and replaced by a corresponding part of the opaque light-absorbing layer 19, the boundaries of this part of the layer 19 being indicated in Fig. 1 by the dotted lines 20. The light-absorbing layer 19 is formed by a layer of a black synthetic resin, e. g. a black vinyl resin, applied to the rear surface of the panel by a pressure moulding operation to ensure the necessary intimate contact between the layer and the panel surface. Alternatively the light-absorbing layer may be painted on. The width of the said layer from the edge of the respective instrument aperture depends upon the distance of the respective light source from the aperture, the width being such that all rays which would otherwise be directed from the panel rear surface toward the observer are absorbed, or are absorbed as much as possible.

We claim:

1. A trans-illuminated panel for the illumination of a surface of a member, comprising a sheet of light-transmitting material having an aperture for viewing through the panel the surface to be illuminated of a member disposed behind the panel, and a light-source aperture spaced from the first-mentioned aperture and for the reception of a light source for illuminating the said surface, the part of the edge of the first-mentioned aperture proximate to the light source aperture being concave toward the light source aperture and exhibiting an extended arcuate area having as a center of curvature in the plane of the sheet the central axis of said light source aperture.

2. A trans-illuminated panel for the illumination of a surface of a member, comprising a sheet of light-transmitting material having an aperture for viewing through the panel the surface to be illuminated of a member disposed behind the panel, and at least two light source apertures, each spaced from the first-mentioned aperture and for the reception of a respective light source for illuminating the said surface, the part of the edge of the first-mentioned aperture proximate to each light source aperture being concave toward the light source aperture and exhibiting an extended arcuate area having as a center of curvature in the plane of the sheet the central axis of said light source aperture.

3. A trans-illuminated panel for the illumination of a plurality of surfaces of members, comprising a sheet of light-transmitting material having a plurality of apertures for viewing through the panel the respective surfaces to be illuminated of members disposed behind the panel, and a plurality of light source apertures, each spaced from the first-mentioned apertures and for the reception of a respective light source, the part of the edge of each first-mentioned aperture proximate to a light source aperture being concave toward the said light source aperture and exhibiting an extended arcuate area having as a center of curvature in the plane of the sheet the central axis of said light source aperture.

4. A trans-illuminated panel for the illumination of a plurality of surfaces of members, comprising a sheet of light-transmitting material having a plurality of apertures for viewing through the panel the respective surfaces to be illuminated of members disposed behind the panel, and a light source aperture spaced from the first-mentioned apertures and for the reception of a light source, the part of the edge of each first-mentioned aperture proximate to the light source aperture being concave toward the light source aperture and exhibiting an extended arcuate area having as a center of curvature in the plane of the sheet the central axis of said light source aperture.

5. A trans-illuminated panel for the illumination of a surface of a member, comprising a sheet of light-transmitting material having an aperture for viewing through the panel the surface to be illuminated of a member disposed behind the panel, a light-absorbing layer surrounding said aperture on the side thereof nearest to the surface to be illuminated and a light source aperture spaced from the first-mentioned aperture and for the reception of a light source for illuminating the said surface, the part of the edge of the first-mentioned aperture proximate to the light source aperture being concave toward the light source aperture and exhibiting an extended arcuate area having as a center of curvature in the plane of the sheet the central axis of said light source aperture.

6. A trans-illuminated panel for the illumination of a surface of a member, comprising a sheet of light-transmitting material having an aperture for viewing through the panel the surface to be illuminated of a member disposed behind the panel, a pressure-moulded light-absorbing layer of an opaque synthetic resin surrounding the first-mentioned aperture on the side of the panel nearest to the surface to be illuminated, and a light-source aperture spaced from the first-mentioned aperture and for the reception of a light source for illuminating the said surface, the part of the edge of the first-mentioned aperture proximate to the light-source aperture being concave toward the light source aperture and exhibiting an extended arcuate area having as a center of curvature in the plane of the sheet the central axis of said light source aperture.

References Cited in the file of this patent

UNITED STATES PATENTS

| | | |
|---|---|---|
| 2,259,910 | Rylsky | Oct. 21, 1941 |
| 2,695,354 | Neugass | Nov. 23, 1954 |
| 2,723,342 | Neugass | Nov. 8, 1955 |

FOREIGN PATENTS

| | | |
|---|---|---|
| 895,017 | France | Jan. 12, 1945 |